(12) United States Patent
Tanaka et al.

(10) Patent No.: US 9,573,581 B2
(45) Date of Patent: Feb. 21, 2017

(54) HYBRID VEHICLE

(71) Applicant: Toyota Jidosha Kabushiki Kaisha, Toyota-shi, Aichi-ken (JP)

(72) Inventors: Nobuyuki Tanaka, Toyota (JP); Noritake Mitsutani, Toyota (JP); Junta Izumi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/819,591

(22) Filed: Aug. 6, 2015

(65) Prior Publication Data

US 2016/0039404 A1 Feb. 11, 2016

(30) Foreign Application Priority Data

Aug. 8, 2014 (JP) ................................ 2014-162689

(51) Int. Cl.

| | |
|---|---|
| *B60W 10/08* | (2006.01) |
| *B60W 10/06* | (2006.01) |
| *B60W 20/00* | (2016.01) |
| *B60W 30/18* | (2012.01) |
| *B60L 11/18* | (2006.01) |
| *B60K 6/445* | (2007.10) |

(52) U.S. Cl.
CPC ............. *B60W 10/08* (2013.01); *B60K 6/445* (2013.01); *B60L 11/1811* (2013.01); *B60L 11/1842* (2013.01); *B60W 10/06* (2013.01); *B60W 20/00* (2013.01); *B60W 30/18054* (2013.01); *Y02T 10/6286* (2013.01); *Y02T 10/7005* (2013.01); *Y02T 10/7241* (2013.01); *Y10S 903/93* (2013.01)

(58) Field of Classification Search
None
See application file for complete search history.

(56) References Cited

U.S. PATENT DOCUMENTS

| 8,838,317 B2 * | 9/2014 | Okuda ..................... B60K 6/48 |
| | | 180/65.265 |
| 9,079,485 B2 * | 7/2015 | Duan ...................... B60K 6/383 |
| 2009/0166109 A1 * | 7/2009 | Duan ...................... B60K 6/383 |
| | | 180/65.28 |
| 2013/0158766 A1 * | 6/2013 | Okuda ..................... B60K 6/48 |
| | | 701/22 |
| 2014/0232182 A1 * | 8/2014 | Kinomura ............. B60L 11/123 |
| | | 307/10.1 |

(Continued)

FOREIGN PATENT DOCUMENTS

| JP | 2000234539 A | 8/2000 |
| JP | 2000-303874 A | 10/2000 |

(Continued)

*Primary Examiner* — Yonel Beaulieu
*Assistant Examiner* — Krishnan Ramesh
(74) *Attorney, Agent, or Firm* — Dinsmore & Shohl LLP

(57) ABSTRACT

A power I/F unit is for outputting at least one of electric power stored in a power storage device and electric power generated by a motor generator driven by an engine to outside of a vehicle. An ECU selectively executes a first power feeding operation in which external power feeding is performed with the engine actuated and a second power feeding operation in which external power feeding is performed with the engine stopped. The ECU executes the first power feeding operation for a predetermined period from the start of external power feeding.

6 Claims, 7 Drawing Sheets

(56) References Cited

U.S. PATENT DOCUMENTS

2015/0191164 A1* 7/2015 Kinomura ............ B60W 10/08
　　　　　　　　　　　　　　　　　　　　　701/22

FOREIGN PATENT DOCUMENTS

| JP | 2013-051772 A | 3/2013 |
| JP | 2013-099035 A | 5/2013 |
| JP | 2013-189161 A | 9/2013 |
| JP | 2014-090526 A | 5/2014 |
| JP | 2015-063174 A | 4/2015 |
| WO | 2014033915 A1 | 3/2014 |
| WO | 2015044741 A1 | 4/2015 |

* cited by examiner

HYBRID VEHICLE

This nonprovisional application is based on Japanese Patent Application No. 2014-162689 filed on Aug. 8, 2014 with the Japan Patent Office, the entire contents of which are hereby incorporated by reference.

BACKGROUND OF THE INVENTION

Field of the Invention

The present invention relates to a hybrid vehicle, and more particularly to a hybrid vehicle capable of executing external power feeding in which electric power is output from the vehicle to the outside of the vehicle.

Description of the Background Art

Japanese Patent Laying-Open No. 2013-51772 discloses a hybrid vehicle capable of external power feeding from the vehicle to electrical equipment external to the vehicle. In this hybrid vehicle, the engine is actuated to allow the motor generator to generate power, and the generated power can be supplied to electrical equipment external to the vehicle. This hybrid vehicle is also capable of external power feeding without actuating the engine, that is, can supply only the electric power stored in a power storage device to electrical equipment external to the vehicle.

The increasing capacity of power storage devices mounted on vehicles enables external power feeding for a long time only from the power storage device without actuating the engine. However, if, after the power feeding operation without actuating the engine continues for a long time since the start of external power feeding, the external power feeding is switched to that with actuation of the engine due to reduction in state of charge (SOC) of the power storage device or other reasons, the sudden start of the engine may surprise people around the vehicle.

SUMMARY OF THE INVENTION

An object of the present invention is therefore to provide a hybrid vehicle capable of external power feeding, in which a notice that the engine may be started in connection with external power feeding is appropriately given to the surroundings of the vehicle.

According to the present invention, a hybrid vehicle includes an engine, a rotating electric machine driven by the engine, a power storage device, a power output unit for external power feeding, and a control device. The power output unit is configured to output at least one of electric power stored in the power storage device and electric power generated by the rotating electric machine to outside of the vehicle. The control device selectively executes a first power feeding operation in which the external power feeding is performed with the engine actuated and a second power feeding operation in which the external power feeding is performed with the engine stopped. The control device executes the first power feeding operation for a predetermined period from start of the external power feeding.

In this hybrid vehicle, the first power feeding operation with actuation of the engine and the second power feeding operation with the engine stopped can be selectively executed. Since the first power feeding operation is executed for a predetermined period from the start of external power feeding, people around the vehicle can realize that the engine may be actuated during external power feeding for this hybrid vehicle. Since the notice to the surroundings of the vehicle that the engine may be actuated during external power feeding is given by actuating the engine per se, there is no need for providing a special device for notification. Since the first power feeding operation from the start of external power feeding is limited to a predetermined period, exhaust gas in connection with the first power feeding operation can be suppressed.

The "start of external power feeding" may be, for example, when the user gives an instruction to execute external power feeding through an operation unit operable by the user, when output of electric power through external power feeding is actually started, or when electrical equipment external to the vehicle is connected to the power output unit.

Preferably, the control device alternately executes the first and second power feeding operations until the external power feeding is finished, after the first power feeding operation is executed for the predetermined period from start of the external power feeding.

In this hybrid vehicle, the first and second power feeding operations are alternately executed until external power feeding is finished after the elapse of a predetermined time from the start of external power feeding. Also in this respect, exhaust gas in connection with actuation of the engine can be suppressed.

Preferably, the hybrid vehicle is configured to be able to select one of an EV mode and an HV mode as a mode of the external power feeding. The control device executes the second power feeding operation until a quantity of state (for example, SOC or voltage of the power storage device) showing a state of charge of the power storage device decreases to an end-of-discharge threshold, when the EV mode is selected. The control device executes the first power feeding operation and the second power feeding operation in a switchable manner in accordance with the quantity of state, when the HV mode is selected. The control device executes the first power feeding operation irrespective of the quantity of state for the predetermined period from start of the external power feeding, when the HV mode is selected.

With such a configuration, it can be recognized in the vicinity of the vehicle that the user who performs the power feeding starting operation has selected the HV mode.

Preferably, the power storage device can store electric power generated by the rotating electric machine. The control device executes control for actuating the engine without power generation by the rotating electric machine if the quantity of state exceeds a predetermined value.

If power generation is performed by the rotating electric machine in a state in which the state of charge of the power storage device is high, degradation of the power storage device is accelerated. In this hybrid vehicle, if the state of charge of the power storage device is high, control for actuating the engine without power generation by the rotating electric machine is executed, so that degradation of the power storage device can be suppressed while a notice that the engine may be actuated during external power feeding is given to the surroundings of the vehicle.

Preferably, the hybrid vehicle further includes a charging device configured to receive electric power supply from a power source external to the vehicle to charge the power storage device.

In such a hybrid vehicle, a large-capacity power storage device may be employed and therefore the second power feeding operation with the engine stopped can continue for a long time from the start of external power feeding. In this hybrid vehicle, since the first power feeding operation is executed for a predetermined period from the start of external power feeding, people around the vehicle may realize that the engine may be actuated during external power feeding.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
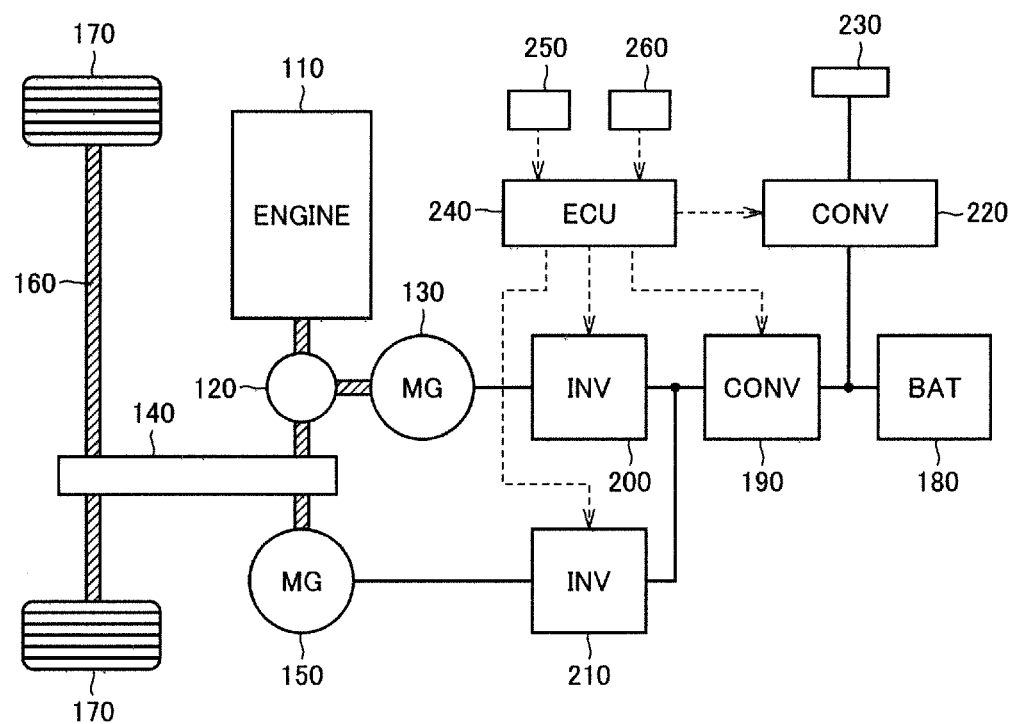
FIG. 1 is a block diagram illustrating an overall configuration of a hybrid vehicle according to a first embodiment of the present invention.

Embodiments of the present invention will be described in details below with reference to the drawings. A plurality of embodiments are described below, and it is originally intended that the configurations described in the embodiments can be appropriately combined. In the drawings, the same or corresponding parts are denoted with the same reference signs and a description thereof is not repeated.

[First Embodiment]

FIG. 1 is a block diagram illustrating an overall configuration of a hybrid vehicle according to a first embodiment of the present invention. Referring to FIG. 1, a hybrid vehicle 10 includes an engine 110, a power spilt device 120, motor generators 130, 150, a transmission gear 140, a drive shaft 160, and wheels 170.

Engine 110 is an internal combustion engine that converts thermal energy produced by combustion of fuel into kinetic energy of moving elements such as a piston and a rotor to output power. Preferable examples of the fuel for engine 110 include hydrocarbon-based fuels such as gasoline, light oil, ethanol, liquid hydrogen, and natural gas, and liquid or gas hydrogen fuels.

Motor generators 130, 150 are AC rotating electric machines and each configured with, for example, a three-phase AC synchronous motor. Motor generator 130 is used as a power generator that can be driven by engine 110 via power split device 120 to generate power and is also used as a motor for starting engine 110. Motor generator 150 mainly operates as a motor and drives drive shaft 160. On the other hand, motor generator 150 operates as a power generator to generate regenerative power during braking of the vehicle and during reduction in acceleration at downhill slopes.

Power split device 120 includes, for example, a planetary gear train having three rotation shafts of a sun gear, a carrier, and a ring gear. Power split device 120 splits driving force of engine 110 into power to be transmitted to the rotation shaft of motor generator 130 and power to be transmitted to transmission gear 140. Transmission gear 140 is coupled to drive shaft 160 for driving wheels 170. Transmission gear 140 is also coupled to the rotation shaft of motor generator 150.

Hybrid vehicle 10 further includes a power storage device 180, converters 190, 220, and inverters 200, 210, a power interface (I/F) unit 230, and an ECU 240.

Power storage device 180 is a rechargeable DC power source and is configured with, for example, a secondary battery such as a nickel metal hydride battery and a lithium ion battery, or a large-capacity capacitor. Power storage device 180 receives electric power generated by motor generator 130 driven by engine 110 from converter 190 and is charged with the received power. Power storage device 180 receives regenerative power generated by motor generator 150 from converter 190 during running and is charged with the received power. During charging of power storage device 180 by a power source (not shown, hereinafter also referred to as "external power source"), external to the vehicle, connected to power I/F unit 230 (hereinafter also referred to as "external charge"), power storage device 180 may also receive electric power supplied from the external power source from converter 220 and be charged with the received power.

Power storage device 180 then supplies the stored electric power to converter 190 when motor generator 150 is driven during running or when motor generator 130 is driven during starting of engine 110. Power storage device 180 further supplies the stored electric power to converter 220 during external power feeding to electrical equipment (not shown) electrically connected to power I/F unit 230.

The state of charge of power storage device 180 is shown, for example, by an SOC value that represents the amount of stored power at present, in percentages, relative to the full charge state of power storage device 180. The SOC value is calculated, for example, based on output voltage and/or input/output current of power storage device 180 that is detected by a not-shown voltage sensor and/or current sensor. The SOC value may be calculated by an ECU separately provided on power storage device 180 or may be calculated by ECU 240 based on the detected values of output voltage and/or input/output current of power storage device 180. The voltage of power storage device 180 may be used as the quantity of state showing the state of charge of power storage device 180.

Converter 190 adjusts DC voltage between converter 190 and inverters 200, 210 to a voltage equal to or higher than the voltage of power storage device 180, based on a control signal from ECU 240. Converter 190 is configured with, for example, a reversible boost chopper circuit.

Inverter 200 performs bidirectional DC/AC power conversion between motor generator 130 and converter 190, based on a control signal received from ECU 240. Similarly, inverter 210 performs bidirectional DC/AC power conversion between motor generator 150 and converter 190, based on a control signal received from ECU 240. Motor generators 130, 150 thus can exchange electric power with power storage device 180 through converter 190 and inverters 200, 210 to output positive torque for operating as a motor or negative torque for operating as a generator.

Converter 220 is provided between power I/F unit 230 and a power line disposed between power storage device 180 and converter 190. In execution of external power feeding, converter 220 converts electric power stored in storage device 180 and/or electric power generated by motor generator 130 driven by engine 110 into a voltage at a voltage level for external power feeding, based on a control signal received from ECU 240, and outputs the converted voltage to power I/F unit 230. In execution of external charging, converter 220 converts electric power from an external power source input from power I/F unit 230 into a charge voltage for power storage device 180 and outputs the converted voltage to power storage device 180.

Power I/F unit 230 functions as a power output unit for supplying electric power output from converter 220 to electrical equipment external to the vehicle during external power feeding. For example, power I/F unit 230 is configured to be able to be connected with the connector on the electrical equipment side for receiving supply of electric power during external power feeding, or the connector of a power cable connected to the electrical equipment. In the first embodiment, power storage device 180 can be externally charged, and power I/F unit 230 can be connected with a charge cable connected to an external power source.

ECU 240 includes a CPU (Central Processing Unit), a storage device, and an input/output buffer (all of them not shown) and controls each unit in hybrid vehicle 10. The control is not limited to processing by software, and processing by dedicated hardware (electronic circuits) is also possible.

As principal control of ECU 240, ECU 240 receives an instruction to execute external power feeding and then controls converter 220 such that electric power is output to electrical equipment external to the vehicle through power I/F unit 230 (external power feeding control). In the present first embodiment, the user can give an instruction to execute external power feeding through an operation unit 250 operable by the user.

In performing external power feeding, ECU 240 selectively executes a first power feeding operation in which external power feeding is performed with engine 110 actuated to allow motor generator 130 to generate power and a second power feeding operation in which external power feeding is performed with engine 110 stopped. Specifically, during execution of the first power feeding operation, ECU 240 controls engine 110 and inverter 200 such that engine 110 is actuated to allow motor generator 130 to generate power, and also controls converter 220 such that external power feeding is performed.

When electric power (feed power) output from power I/F unit 230 is smaller than electric power generated by motor generator 130, power storage device 180 is charged with the difference between the power generated by motor generator 130 and the power fed to the outside of the vehicle. On the other hand, when electric power fed to the outside of the vehicle is larger than electric power generated by motor generator 130, electric power equivalent to the difference between the feed power and the power generated by motor generator 130 is taken out from power storage device 180.

During execution of the second power feeding operation, ECU 240 stops engine 110 and controls converter 220 such that external power feeding is performed. In the second power feeding operation, electric power is only taken out from power storage device 180.

Here, in hybrid vehicle 10 according to the present first embodiment, the user can select an EV mode or an HV mode as a power feed mode during external power feeding, through an operation unit 260 operable by the user. The EV mode is a power feed mode in which the second power feeding operation alone is executed, and external power feeding is performed only from power storage device 180 until the SOC of power storage device 180 decreases to a predetermined end-of-discharge threshold. The HV mode is a power feed mode in which the first and second power feeding operations are alternately performed, and external power feeding is performed while power is intermittently generated by motor generator 130 by appropriately switching between actuation and stop of engine 110 in accordance with the SOC of power storage device 180.

As described above, when the HV mode is selected as a power feed mode, engine 110 may be actuated during external power feeding. When the SOC of power storage device 180 is high, electric power stored in power storage device 180 can be supplied to the outside of the vehicle and, basically, the second power feeding operation with engine 110 stopped can be executed. When the SOC decreases, the first power feeding operation can be executed so that engine 110 is actuated to allow motor generator 130 to generate power.

However, when power storage device 180 has a large capacity, the second power feeding operation may continue for a long time after the start of external power feeding. If, after the second power feeding operation without actuating engine 110 continues for a long time, the operation is switched to the first power feeding operation with actuation of engine 110 due to decrease in the SOC of power storage device 180 or other reasons, the sudden start of engine 110 may surprise people around the hybrid vehicle 10.

In hybrid vehicle 10 according to the present first embodiment, therefore, when the HV mode is selected as a power feed mode at the start of external power feeding, ECU 240 executes the first power feeding operation with actuation of engine 110 for a predetermined period from the start of external power feeding in order to give a notice to the surroundings of the vehicle that engine 110 may be actuated during external power feeding. People around the vehicle therefore can realize that engine 110 may be actuated during external power feeding in hybrid vehicle 10. Since the notice to the surroundings of the vehicle that engine 110 may be actuated during external power feeding is given by actuating engine 110 per se, there is no need for providing a special device for notification. Since the first power feeding operation from the start of external power feeding is limited to a predetermined period, exhaust gas from engine 110 in connection with the first power feeding operation is suppressed.

The "start of external power feeding" is, for example, when the user gives an instruction to execute external power feeding through operation unit 250, when output of electric power through external power feeding is actually started (for example, when the electrical equipment connected to power I/F unit 230 is switched on), or when electrical equipment is connected to power I/F unit 230. In such cases, people around the vehicle are not surprised with the start of engine 110.

Figure 2:
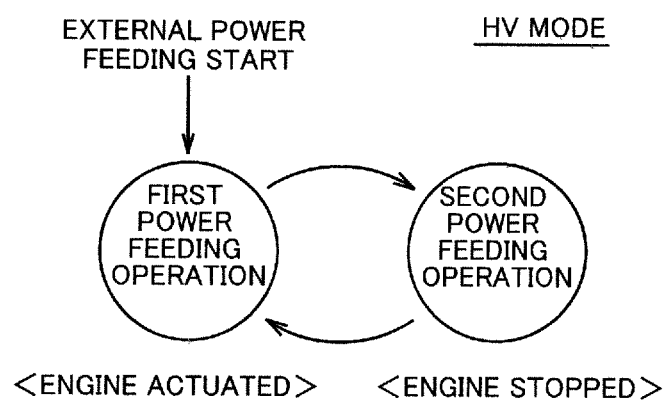
FIG. 2 is a conceptual diagram illustrating transition of power feeding operation in an HV mode.

FIG. 2 is a conceptual diagram illustrating transition of power feeding operation in the HV mode. Referring to FIG. 2, in the HV mode, the first power feeding operation with actuation of engine 110 and the second power feeding operation without actuation of engine 110 are appropriately switched. In the present first embodiment, the first power feeding operation and the second power feeding operation are periodically switched as described below. However, the second power feeding operation may be performed until the SOC of power storage device 180 decreases to a predetermined value due to execution of external power feeding, and thereafter the first power feeding operation and the second power feeding operation may be appropriately switched such that the SOC falls within a predetermined range.

In hybrid vehicle 10 according to the present first embodiment, when the HV mode is selected, the first power feeding operation is initially executed for a predetermined period upon the start of external power feeding. The predetermined period may be appropriately set to a time necessary to give a notice to the surrounding of the vehicle that the HV mode in which engine 110 may be actuated during external power feeding is selected. After then, the second power feeding operation and the first power feeding operation are switched periodically (or in accordance with the SOC of power storage device 180).

As described above, since the actuation of engine 110 after the start of external power feeding is limited to a predetermined period, actuation of engine 110, which is essentially unnecessary if the SOC is high, can be suppressed where possible, thereby suppressing exhaust gas in connection with external power feeding. In the present first embodiment, the second power feeding operation and the first power feeding operation are alternately executed periodically even after execution of the first power feeding operation after the start of external power feeding. Also in this respect, the actuation of engine 110 and the resulting exhaust gas are suppressed.

Figure 3:
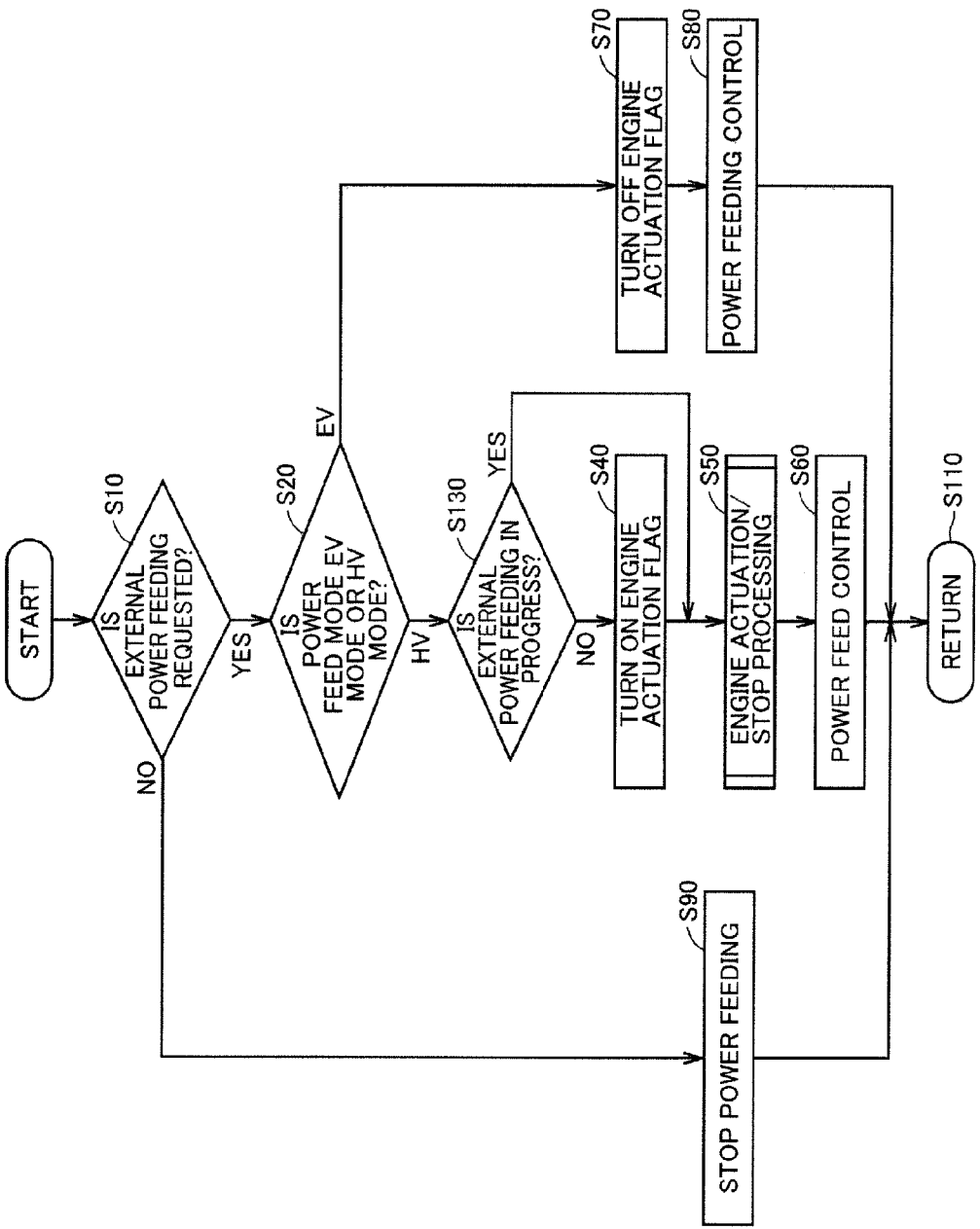
FIG. 3 is a flowchart illustrating the processing procedure of external power feeding control executed by an ECU shown in FIG. 1.
Figure 4:
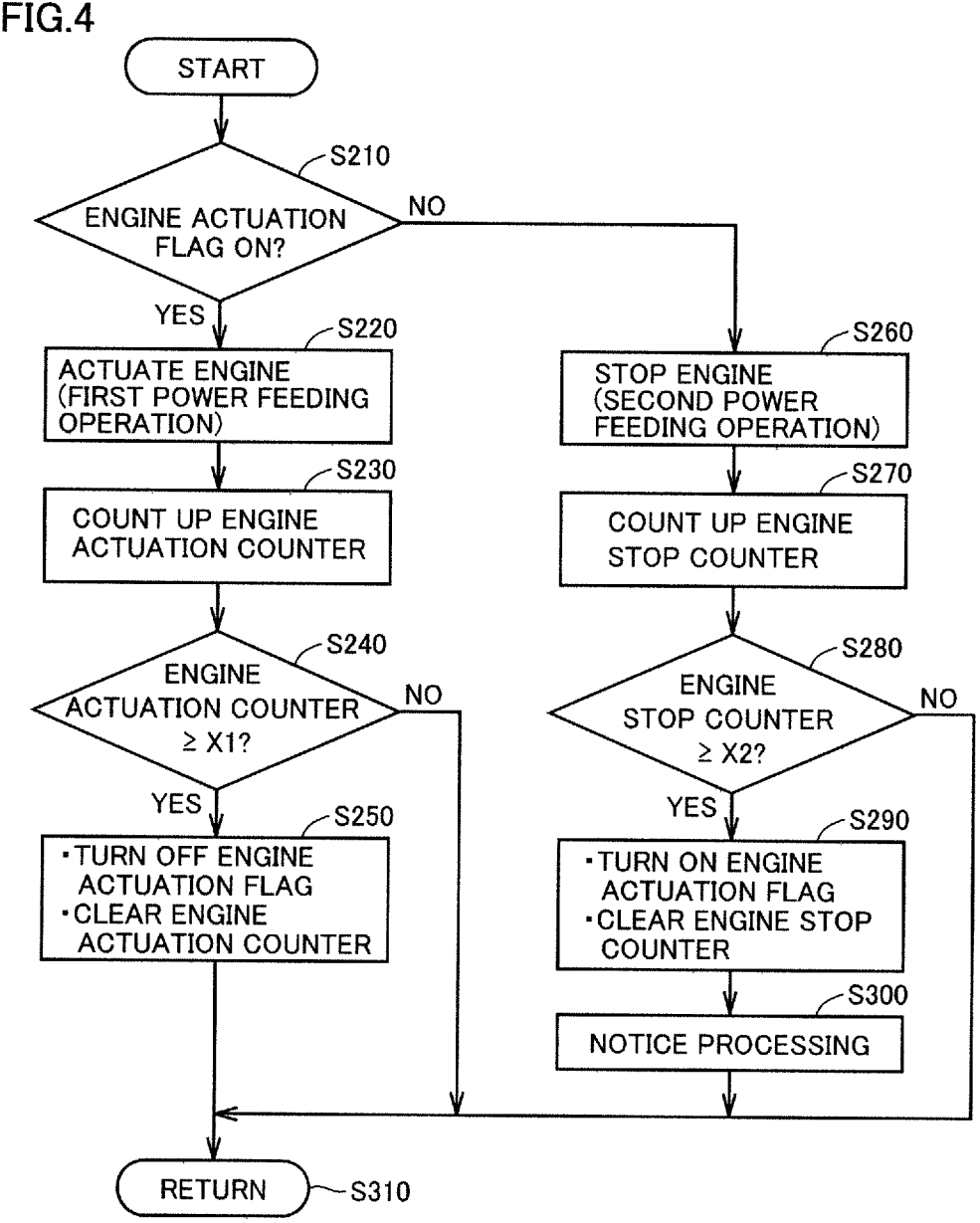
FIG. 4 is a flowchart illustrating the procedure of engine actuation/stop processing executed in step S50 shown in FIG. 3.

FIG. 3 and FIG. 4 are flowcharts illustrating the processing procedure of external power feeding control executed by ECU 240 shown in FIG. 1. The processing shown in the flowcharts is invoked from the main routine and executed at predetermined time intervals or when a predetermined condition is met.

Referring to FIG. 3, ECU 240 determines whether external power feeding is requested, based on a signal from operation unit 250 (step S10). If it is determined that external power feeding is not requested (NO in step S10), external power feeding is stopped if external power feeding has been executed so far (step S90).

If it is determined that external power feeding is requested in step S10 (YES in step S10), ECU 240 determines whether the EV mode is selected or the HV mode is selected as a power feed mode through operation unit 260, based on a signal from operation unit 260 (step S20).

If the EV mode is selected as a power feed mode ("EV" in step S20), ECU 240 turns off an engine actuation flag for requesting actuation of engine 110 (step S70) and executes external power feeding control (step S80). That is, when the EV mode is selected, the second power feeding operation without actuation of engine 110 is executed, and electric power stored in power storage device 180 is supplied to the outside of the vehicle.

If it is determined that the HV mode is selected as a power feed mode in step S20 (YES in step S20), ECU 240 determines whether external power feeding is already being executed (step S30). If it is determined that external power feeding is not in progress (NO in step S30), ECU 240 turns on the engine actuation flag. On the other hand, if it is determined that external power feeding is in progress in step S30 (YES in step S30), the processing of ECU 240 proceeds to step S50 without executing step S40. That is, when external power feeding is requested and the HV mode is selected as a power feed mode, ECU 240 turns on the engine actuation flag if external power feeding has not been started, that is, at the start of external power feeding. If external power feeding has already been executed, ECU 240 keeps the previous state without forcedly turning on the engine actuation flag.

ECU 240 then executes an engine actuation/stop processing shown in FIG. 4 as described below (step S50) and executes external power feeding control (step S60). The processing in step S60 may not always be performed after execution of the processing in step S50 and may be executed concurrently with the processing in step S50.

FIG. 4 is a flowchart illustrating the procedure of the engine actuation/stop processing executed in step S50 shown in FIG. 3. Referring to FIG. 4, ECU 240 determines whether the engine actuation flag is on (step S210). If it is determined that the engine actuation flag is on (YES in step S210), ECU 240 actuates engine 110 (the first power feeding operation) (step S220). As described in steps S20 to S40 in FIG. 3, the engine actuation flag is turned on at the start of external power feeding when the HV mode is selected. Engine 110 is therefore actuated immediately when external power feeding is started in the HV mode.

When engine 110 is actuated, ECU 240 counts up an engine actuation counter for counting the actuation time of engine 110 (step S230). If the engine actuation counter reaches a predetermined value X1 or larger (YES in step S240), ECU 240 turns off the engine actuation flag and clears the engine actuation counter to zero (step S250).

On the other hand, if it is determined that the engine actuation flag is off in step S210 (NO in step S210), ECU 240 stops engine 110 (the second power feeding operation) (step S260). When engine 110 is stopped, ECU 240 counts up an engine stop counter for counting the stop time of engine 110 (step S270). If the engine stop counter reaches a predetermined value X2 or larger (YES in step S280), ECU 240 turns on the engine actuation flag and clears the engine stop counter to zero (step S290).

ECU 240 then executes predetermined notice processing for giving a notice that engine 110 will be actuated (step S300). A variety of means can be employed as a notice. For example, sound may be produced, an indicator may be provided on an instrument panel or car navigation system screen, or information may be transmitted to an information terminal (for example, a smart phone) carried by the user.

As described above, in the present first embodiment, the first power feeding operation with actuation of engine 110 and the second power feeding operation with engine 110 stopped can be selectively executed. The first power feeding operation is executed for a predetermined time from the start of external power feeding, so that people around the vehicle can realize that engine 110 may be actuated during external power feeding for this hybrid vehicle 10. Since the notice to the surroundings of the vehicle that engine 110 may be actuated during external power feeding is given by actuating engine 110 per se, there is no need for providing a special device for notification. Since the first power feeding operation from the start of external power feeding is limited to a predetermined period, exhaust gas in connection with the first power feeding operation can be suppressed.

According to the present first embodiment, the first and second power feeding operations are alternately executed until external power feeding is finished after the elapse of a predetermined period from the start of external power feeding. Also in this respect, exhaust gas in connection with actuation of engine 110 can be suppressed.

[Second Embodiment]

In the foregoing first embodiment, when external power feeding is requested and the HV mode is selected as a power feed mode, engine 110 is actuated for a predetermined period after the start of external power feeding in order to give a notice to the surroundings of the vehicle that engine 110 may be actuated during external power feeding. However, there may be a case where the SOC of power storage device 180 is high at the start of external power feeding. If the SOC is high, it is desirable that power generation by motor generator 130 be suppressed in order to avoid overcharge of power storage device 180. In the present second embodiment, therefore, when the first power feeding operation with actuation of engine 110 in the HV mode is executed, if the SOC of power storage device 180 is equal to or higher than a predetermined threshold, engine 110 is actuated in self-sustained operation (idle operation) in which engine 110 does not substantially output torque. Overcharge of power storage device 180 therefore can be avoided while a notice is given to the surroundings of the vehicle by actuating engine 110.

The overall configuration of the hybrid vehicle according to the present second embodiment is the same as in hybrid vehicle 10 according to the first embodiment shown in FIG. 1. The hybrid vehicle according to the second embodiment differs from the hybrid vehicle according to the first embodiment in the processing executed in step S50 of the external power feeding processing shown in FIG. 3.

Figure 5:
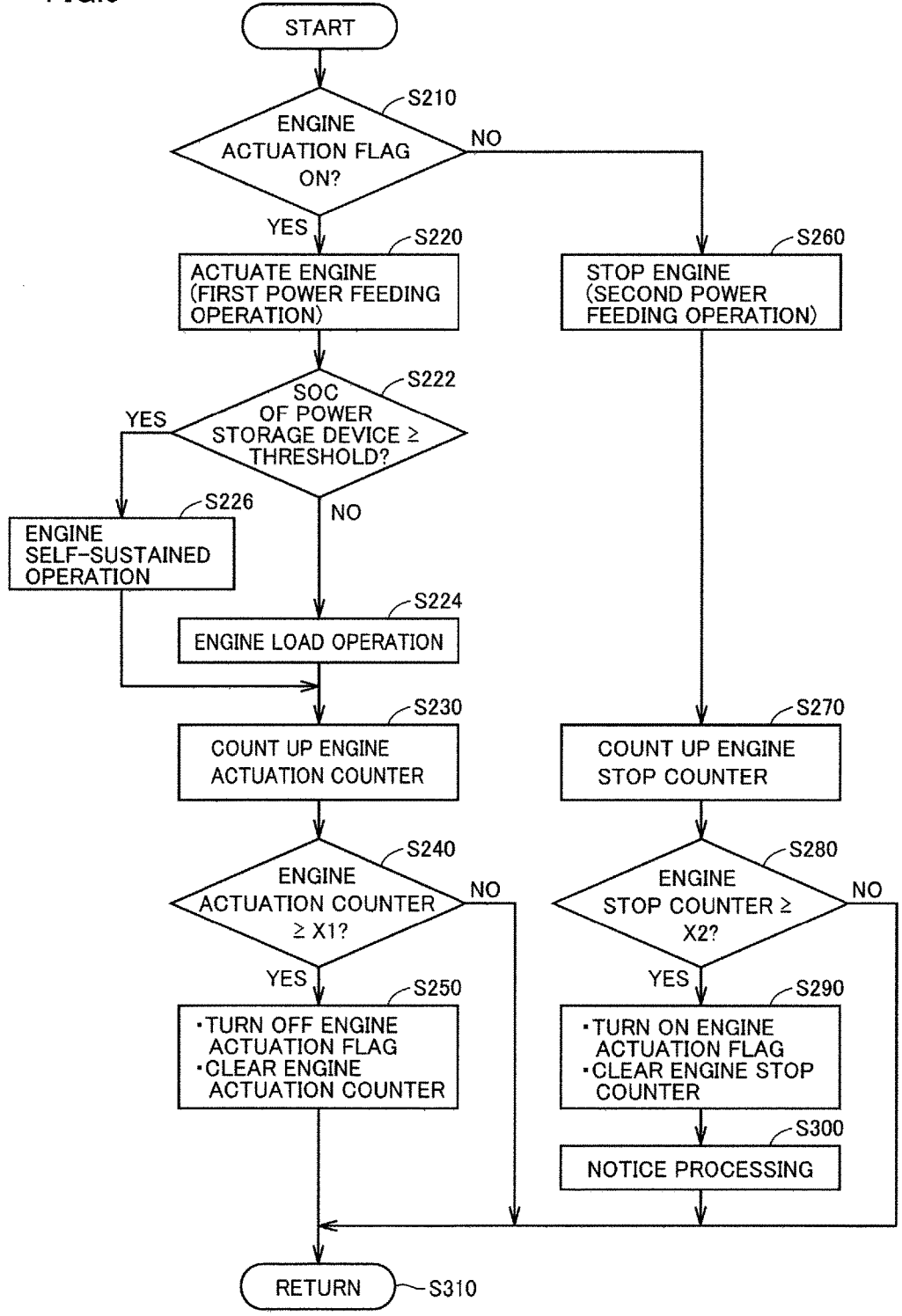
FIG. 5 is a flowchart illustrating the procedure of engine actuation/stop processing executed in step S50 in FIG. 3 in a second embodiment.

FIG. 5 is a flowchart illustrating the procedure of the engine actuation/stop processing executed in step S50 in FIG. 3 in the second embodiment. Referring to FIG. 5, this flowchart further includes steps S222 to S226 in the flowchart illustrating the procedure of the engine actuation/stop processing in the first embodiment shown in FIG. 4.

That is, when engine 110 is actuated in step S220, ECU 240 determines whether the SOC of power storage device 180 is equal to or higher than a predetermined threshold (step S222). The threshold is a level at which charging of power storage device 180 is not desirable when the SOC is equal to or higher than this value, and is set appropriately based on, for example, the degree at which the SOC may increase with the first power feeding operation in a predetermined period after the start of external power feeding.

If it is determined that the SOC is lower than the threshold (NO in step S222), ECU 240 actuates engine 110 in load operation (step S224). Motor generator 130 then receives the driving force of engine 110 to generate power. The generated power is entirely output to the outside of the vehicle if the amount of external power feeding is large, whereas the generated power is partially stored into power storage device 180 if the amount of external power feeding is small. The processing then proceeds to step S230.

On the other hand, if it is determined that the SOC is equal to or higher than the threshold in step S222 (YES in step S222), ECU 240 actuates engine 110 in self-sustained operation (idle operation) (step S226). The self-sustained operation (idle operation) refers to that engine 110 is operated at a predetermined low speed so that engine 110 does not substantially output torque. Engine 110 thus does not substantially output torque although engine 110 is actuated for a notice to the surroundings of the vehicle, and motor generator 130 does not generate power. Accordingly, the SOC of power storage device 180 does not increase and the SOC decreases with external power feeding. The processing then proceeds to step S230.

The processing in other steps is as described in FIG. 4.

As described above, according to the present second embodiment, when the SOC of power storage device 180 is high, control for actuating engine 110 without power generation by motor generator 130 (self-sustained operation) is executed, so that degradation of power storage device 180 can be suppressed while a notice that engine 110 may be actuated during external power feeding is given to the surroundings of the vehicle.

[Other Embodiments]

In the foregoing first and second embodiments, in the HV mode, engine 110 is actuated at predetermined time intervals (the time determined by predetermined value X2 of the engine stop counter). However, if the temperature of catalyst in the exhaust path of engine 110 decreases during a period in which engine 110 is stopped, emission of the exhaust gas is deteriorated at the start of engine 110. In the HV mode, therefore, engine 110 may be actuated when the catalyst temperature decreases.

Figure 6:
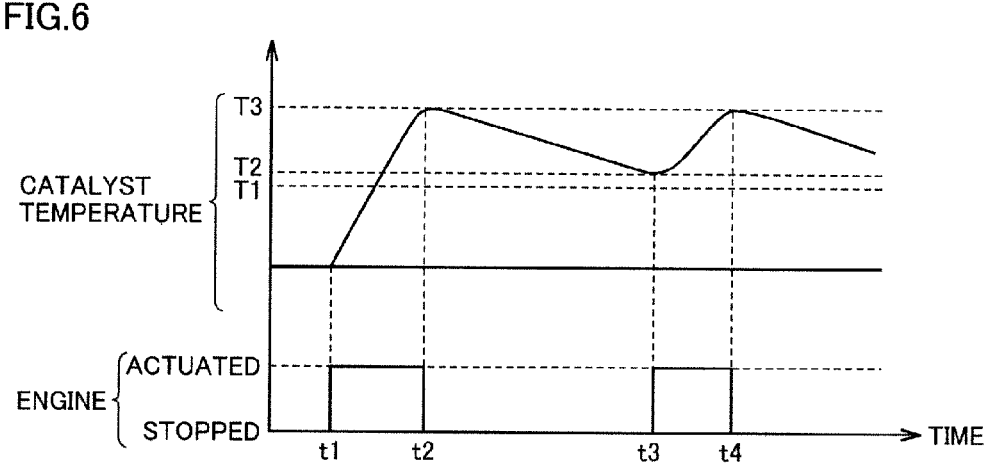
FIG. 6 is a time chart in a case where an engine is switched between actuation and stop in accordance with a catalyst temperature in the HV mode.

FIG. 6 is a time chart in a case where engine 110 is switched between actuation and stop in accordance with the catalyst temperature in the HV mode. Referring to FIG. 6, at time t1, execution of external power feeding is requested, and the HV mode is selected as a power feed mode.

When external power feeding is started, engine 110 is actuated and the temperature of catalyst increases. At time t2, when the catalyst temperature increases to T3, engine 110 is stopped. Thereafter, at time t3, when the catalyst temperature decreases to T2 (T2<T3), engine 110 is actuated again and the catalyst temperature turns to increase. At time t4, when the catalyst temperature increases to T3, engine 110 is stopped. After that, the actuation and stop of engine 110 is repeated in accordance with the catalyst temperature.

Figure 7:
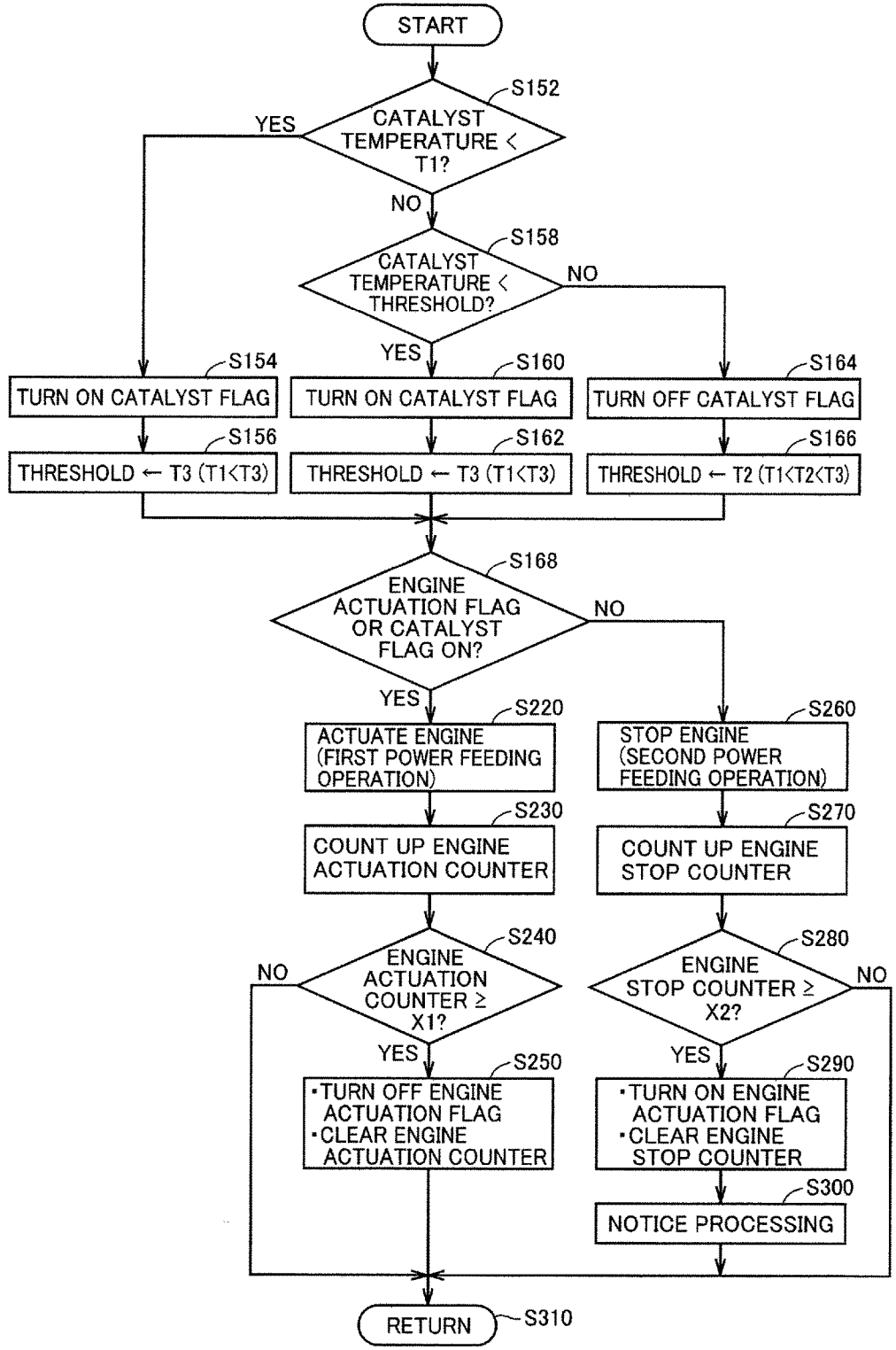
FIG. 7 is a flowchart illustrating the processing procedure of external power feeding control in an embodiment considering a catalyst temperature.

FIG. 7 is a flowchart illustrating the processing procedure of external power feeding control in the embodiment considering the catalyst temperature. The procedure of the overall processing of the external power feeding control in the present embodiment considering the catalyst temperature is the same as in the flowchart shown in FIG. 3 and differs from the first embodiment in the processing executed in step S50. FIG. 7 shows the procedure of the engine actuation/stop processing executed in step S50 shown in FIG. 3 in the present embodiment.

Referring to FIG. 7, this flowchart includes steps S152 to S168 in place of step S210 in the flowchart illustrating the procedure of the engine actuation/stop processing in the first embodiment shown in FIG. 4.

ECU 240 first determines whether the catalyst temperature is lower than T1 (step S152). The catalyst temperature can be estimated from, for example, the cooling water temperature and the amount of intake air of engine 110. If it is determined that the catalyst temperature is lower than T1 (YES in step S152), ECU 240 turns on a catalyst flag (step S154). As described later, when the catalyst flag is on, ECU 240 actuates engine 110. ECU 240 then sets the threshold of the catalyst temperature described later to T3 (T1<T3) (step S156). The processing of ECU 240 then proceeds to step S168 (described later).

In step S152, if it is determined that the catalyst temperature becomes equal to or higher than T1 (NO in step S152), ECU 240 determines whether the catalyst temperature is lower than the threshold (step S158). If it is determined that the catalyst temperature is lower than the threshold (YES in step S158), ECU 240 turns on the catalyst flag (step S160). ECU 240 then sets the threshold to T3 (step S162). The processing of ECU 240 then proceeds to step S168 (described later).

If it is determined that the catalyst temperature is equal to or higher than the threshold in step S158 (NO in step S158), ECU 240 turns off the catalyst flag (step S164). ECU 240 then sets the threshold to T2 (T1<T2<T3) (step S166). The processing of ECU 240 then proceeds to step S168 (described later).

In step S168, ECU 240 determines whether the engine actuation flag or the catalyst flag is on (step S168). If it is determined that one of the engine actuation flag and the catalyst flag is on (YES in step S168), the processing of ECU 240 proceeds to step S220, and engine 110 is actuated (the first power feeding operation). On the other hand, if it is determined that both of the engine actuation flag and the catalyst flag are off in step S168 (NO in step S168), the processing of ECU 240 proceeds to step S260, and engine 110 is stopped (the second power feeding operation).

Through the processing as described above, as shown in FIG. 6, the actuation/stop of engine 110 is executed in accordance with the catalyst temperature. Since engine 110 is actuated when the engine actuation flag or the catalyst flag is on (steps S168, S220), engine 110 is actuated with at least the engine actuation flag on immediately after the start of external power feeding.

In the description above, steps S152 to S168 are included in place of step S210 in the flowchart illustrating the procedure of the engine actuation/stop processing in the first embodiment shown in FIG. 4. However, steps S152 to S168 may be included in place of step S210 in the flowchart illustrating the procedure of the engine actuation/stop processing in the second embodiment shown in FIG. 5.

Although not shown, when external power feeding in the HV mode is requested, if the SOC of power storage device 180 is at a certain level or higher when the fuel level of engine 110 decreases, the HV mode may be automatically switched to the EV mode to continue external power feeding. For the determination of reduction of the fuel level of engine 110 in this case, the determination threshold may be set higher than in the reduction determination in the normal operation (for example, during running). Accordingly, even when the SOC of power storage device 180 is depleted due to external power feeding in the EV mode, room can be left for running the vehicle. In order to ensure that room is left for running, external power feeding may be stopped if the fuel level of engine 110 decreases (the determination threshold is preferably set higher than in the normal operation).

In the foregoing second embodiment, when the first power feeding operation with actuation of engine 110 in the HV mode is executed, if the SOC of power storage device 180 is equal to or higher than a predetermined threshold, engine 110 is set in self-sustained operation (idle operation). However, the temperature condition of power storage device 180 may be additionally set because degradation of power storage device 180 is accelerated if the SOC is kept high at high temperatures. That is, when the first power feeding operation is executed in the HV mode, if the SOC is equal to or higher than a predetermined threshold and the temperature of power storage device 180 is equal to or higher than a predetermined temperature, engine 110 may be set in self-sustained operation (idle operation).

In the foregoing embodiments, the control is performed in hybrid vehicle 10 (FIG. 1) configured such that engine 110 and two motor generators 130, 150 are coupled by power split device 120. However, hybrid vehicles to which the present invention is applied are not limited to such a configuration.

That is, the present invention can be commonly applied to a hybrid vehicle configured such that the engine is actuated during stop of the vehicle to allow the motor generator to generate power and to a hybrid vehicle configured such that the generated power and the power stored in the power storage device can be supplied to the outside of the vehicle. For example, the present invention can also be applied to a series hybrid vehicle in which engine 110 is used only for driving motor generator 130 and motor generator 150 alone produces driving force for the vehicle.

The hybrid vehicle in the foregoing embodiments has been described as a plug-in hybrid vehicle capable of charging power storage device 180 with a power source external to the vehicle. However, the hybrid vehicle to which the present invention is applied is not limited to such a plug-in hybrid vehicle. That is, the present invention can also be applied to a hybrid vehicle without a charging mechanism for charging power storage device 180 with a power source external to the vehicle.

In the foregoing description, power I/F unit 230 corresponds to an embodiment of the "power output unit" in the present invention, and ECU 240 corresponds to an embodiment of the "control device".

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
   an engine;
   a rotating electric machine driven by the engine;
   a power storage device;
   a power output unit for external power feeding configured to output at least one of electric power stored in the power storage device and electric power generated by the rotating electric machine to outside of the vehicle; and
   a control device configured to selectively execute a first power feeding operation and a second power feeding operation, in the first power feeding operation the external power feeding being performed with the engine actuated, in the second power feeding operation the external power feeding being performed with the engine stopped, and
   the control device executing the first power feeding operation for a predetermined period from start of the external power feeding.

2. The hybrid vehicle according to claim 1, wherein the control device alternately executes the first and second power feeding operations until the external power feeding is finished, after the first power feeding operation is executed for the predetermined period from start of the external power feeding.

3. The hybrid vehicle according to claim 1, wherein
   the hybrid vehicle is configured to select one of an EV mode and an HV mode as a mode of the external power feeding,
   the control device
   executes the second power feeding operation until a quantity of state showing a state of charge of the power storage device decreases to an end-of-discharge threshold, when the EV mode is selected, and
   executes the first power feeding operation and the second power feeding operation in a switchable manner in accordance with the quantity of state, when the HV mode is selected, and
   the control device executes the first power feeding operation irrespective of the quantity of state for the predetermined period from start of the external power feeding, when the HV mode is selected.

4. The hybrid vehicle according to claim 1, wherein
   the power storage device can store electric power generated by the rotating electric machine, and
   the control device executes control for actuating the engine without power generation by the rotating electric machine in the first power feeding operation, when a quantity of state showing a state of charge of the power storage device exceeds a predetermined value.

5. The hybrid vehicle according to claim 1, further comprising a charging device configured to receive electric power supply from a power source external to the vehicle to charge the power storage device.

6. The hybrid vehicle according to claim 1, wherein, in the first power feeding operation, the control device actuates the engine in idle operation when a state of charge (SOC) of the power storage device is equal to or higher than a threshold.

* * * * *